US011936682B2

United States Patent
Verbus et al.

(10) Patent No.: US 11,936,682 B2
(45) Date of Patent: Mar. 19, 2024

(54) DEEP LEARNING TO DETECT ABUSIVE SEQUENCES OF USER ACTIVITY IN ONLINE NETWORK

(71) Applicant: Microsoft Technology Licensing, LLC, Redmond, WA (US)

(72) Inventors: James R. Verbus, San Mateo, CA (US); Beibei Wang, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 17/534,148

(22) Filed: Nov. 23, 2021

(65) Prior Publication Data

US 2023/0164173 A1    May 25, 2023

(51) Int. Cl.
*H04L 9/40* (2022.01)
*G06F 21/55* (2013.01)
*G06F 21/62* (2013.01)
*G06N 3/02* (2006.01)
*G06N 3/044* (2023.01)
*H04L 41/16* (2022.01)

(52) U.S. Cl.
CPC ........ *H04L 63/1441* (2013.01); *G06F 21/552* (2013.01); *G06F 21/6263* (2013.01); *G06N 3/02* (2013.01); *G06N 3/044* (2023.01); *H04L 41/16* (2013.01); *H04L 63/1425* (2013.01)

(58) Field of Classification Search
None
See application file for complete search history.

(56) References Cited

U.S. PATENT DOCUMENTS

| 902,654 | A | 11/1908 | Hannas |
| 11,418,485 | B2 * | 8/2022 | Liu .................... H04L 63/1416 |
| 11,586,685 | B2 * | 2/2023 | Feijoo ................. G06F 16/951 |
| 2017/0046787 | A1 * | 2/2017 | Bothwell .............. G06Q 40/08 |
| 2018/0351981 | A1 * | 12/2018 | Muddu ............... G06F 16/9024 |
| 2021/0264233 | A1 * | 8/2021 | Gronát ................ H04L 61/3025 |

(Continued)

OTHER PUBLICATIONS

Luo, et al., "BotGraph: Web Bot Detection Based on Sitemap", In Repository of arXiv:1903.08074v1, Mar. 19, 2019, 7 Pages.

(Continued)

*Primary Examiner* — Chris Parry
*Assistant Examiner* — Abderrahmen Chouat
(74) *Attorney, Agent, or Firm* — Schwegman, Lundberg & Woessner, P.A.

(57) ABSTRACT

In an example embodiment, a deep learning algorithm is introduced that operates directly on a raw sequence of user activity in an online network. This allows the system to scalably leverage more of the available signal hidden in the data and stop adversarial attacks more efficiently than other machine-learned models. More particularly, each specific request path is translated into a standardized token that indicates the type of the request (e.g., profile view, search, login, etc.). This eliminates the need for human curation of features. Then, the standardized request paths are standardized to integers based on the frequency of that request path across all users. This allows information about how common a given type of request is to be provided to the machine-learned model. The integer array is the activity sequence that is fed into the deep learning algorithm.

20 Claims, 9 Drawing Sheets

(56) References Cited

U.S. PATENT DOCUMENTS

| | | | |
|---|---|---|---|
| 2021/0273973 A1* | 9/2021 | Boyer | H04L 63/1416 |
| 2022/0303288 A1* | 9/2022 | Wang | H04L 63/1433 |
| 2023/0007024 A1* | 1/2023 | Maria Vega | H04L 63/1425 |
| 2023/0012220 A1* | 1/2023 | Humphrey | H04L 41/16 |
| 2023/0083949 A1* | 3/2023 | Mutolo | H04L 63/14 726/23 |

OTHER PUBLICATIONS

Zhao, et al., "BotGraph: Large Scale Spamming Botnet Detection", In Proceedings of 6th USENIX Symposium on Networked Systems Design and Implementation, Apr. 22, 2009, pp. 321-334.

Noorshams, et al., "TIES: Temporal Interaction Embeddings for Enhancing Social Media Integrity at Facebook", in Repository of arXiv:2002.07917v1, Feb. 18, 2020, 9 Pages.

* cited by examiner

DEEP LEARNING TO DETECT ABUSIVE SEQUENCES OF USER ACTIVITY IN ONLINE NETWORK

TECHNICAL FIELD

The present disclosure generally relates to technical problems encountered in machine learning. More specifically, the present disclosure relates to the use of deep learning to detect abusive sequences of user activity in an online network.

BACKGROUND

The rise of the Internet has occasioned two disparate yet related phenomena: the increase in the presence of online networks, such as social networking services, with their corresponding user profiles visible to large numbers of people, and the increase in abusive activities taken by unscrupulous actors using the online network. Various types of abusive activities have become commonplace, such as the creation of fake accounts, hacking of legitimate accounts to post content or perform other account activities without the account holder's consent, unauthorized data scraping (where online content, such as user profiles, are scanned by automated bots and the content taken for use outside the online network), and automated spam.

What is needed is a solution that can reduce or eliminate such abusive activities in an online network.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
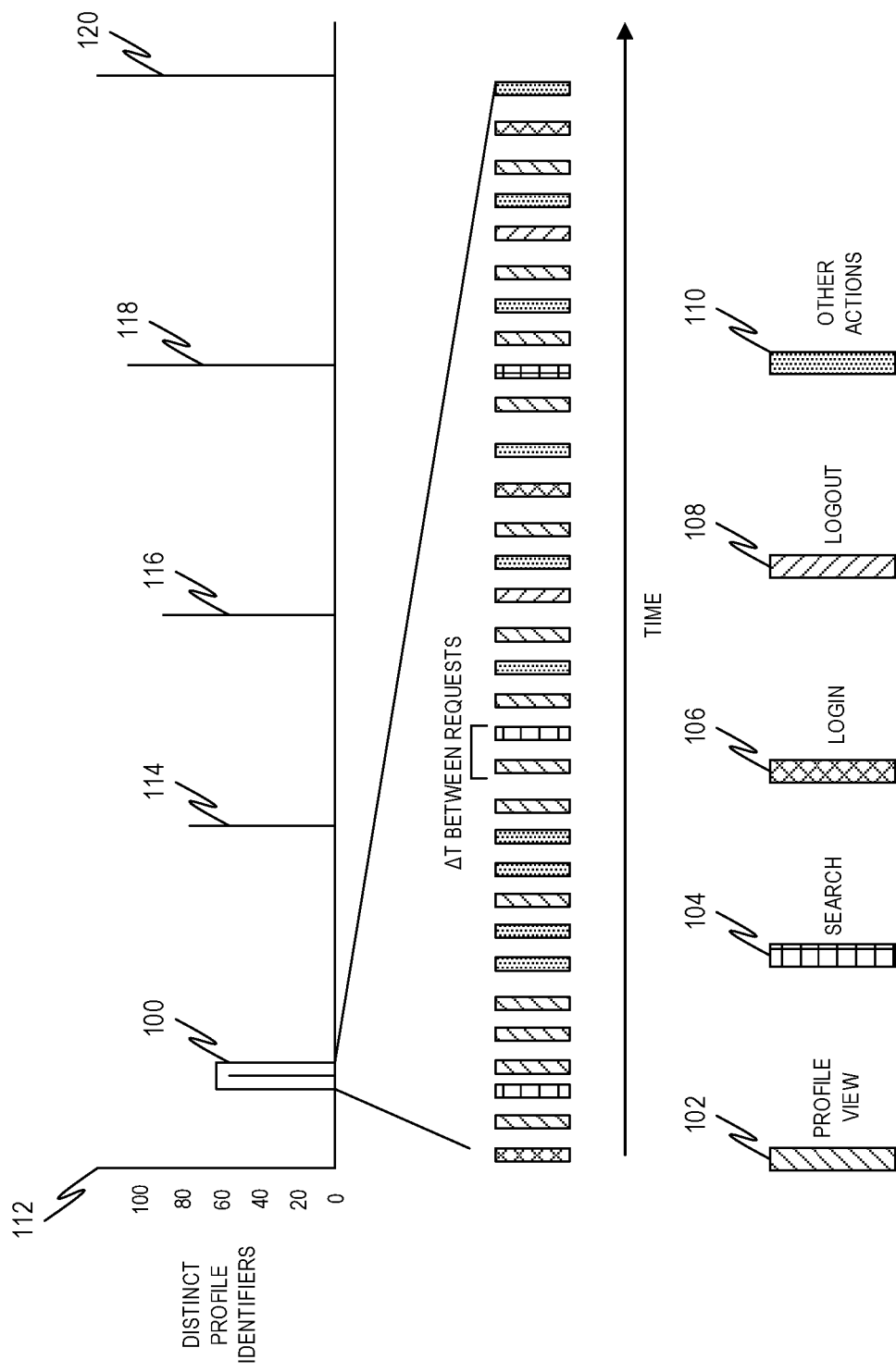
FIG. 1 is a diagram illustrating a visualization of profile scraping activity by a logged-in member, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

One approach to reducing and/or eliminating abusive activities in an online network is to train and utilize a machine-learned model using a machine learning algorithm. The machine-learned model can be trained to identify abusive activities and either alert an administrator who can take steps to stop the abusive activities (e.g., suspending access) or can automatically take such steps.

There are technical problems encountered, however, when applying machine learning to abusive activity detection in an online network. In many online networks there are multiple heterogeneous site surfaces that need to be defended. In other words, there are many different interfaces and/or portions of interfaces that an attacker may use to launch an attack. Each of these site surfaces would need to have its own separately trained machine-learned model. Further, traditional machine-learned models use hand-engineered features that are specific to particular types of abusive behavior and site surface. Additionally, traditional features engineered by humans may not fully leverage the available signals in rich member activity patterns. Lastly, since many of the abusive attacks are initiated with adversarial intent, such attackers are often quick to adapt and evolve to evade anti-abuse defenses.

In an example embodiment, a deep learning machine-learned model is introduced that operates directly on a raw sequence of user activity in an online network. This allows the system to scalably leverage more of the available signals hidden in the data and stop adversarial attacks more efficiently than other machine-learned models.

As a user visits an online network, such as a social networking service, the user's web browser or application makes many requests to the servers of the online network. Each request includes a path identifying the part of the online network the user's browser or application intends to access. In order to directly and scalably leverage the rich signals from member activity patterns, in an example embodiment, a standardized dataset is created, capturing the sequence of user requests to an online network.

More particularly, each specific request path is translated into a standardized token that indicates the type of the request (e.g., profile view, search, login, etc.). This eliminates the need for human curation of features. Then, the standardized request paths are standardized to integers based on the frequency of that request path across all users. This allows information about how common a given type of request is to be provided to the machine-learned model. The integer array is the activity sequence that is fed into the deep learning algorithm.

The deep learning algorithm may then use natural language processing (NLP) techniques to classify these sequences. Rather than classify the sentiment of a sequence of human-language words as positive or negative, however, here a sequence of user requests is classified as abusive or not abusive.

In an example embodiment, a supervised long short-term memory (LSTM) deep learning model is used to produce a score for each encoded request path sequence passed to the model. This score may be termed an "abuse score" and is indicative of a likelihood (as forecast by the model) that the encoded request path sequence is reflective of abusive operations. The type, order, and frequency of the particular requests in the request paths may be used as part of this process. After some preprocessing of the request path sequence data, the sequence of time differences between consecutive requests may be concatenated to leverage timing information.

Training labels may be chosen based on the type of abuse to be detected. For example, to detect logged-in accounts scraping profile data, the ground truth labels used to train the activity sequence model may be indicative of whether scraping actually did occur in a past case (in the training data). In some example embodiments, an unsupervised outlier-detection model, such as one based on an isolation-forest library, may be used to generate the labels.

The result is a machine-learned model that leverages subtle signals associated with the ordering and timing of member requests. This helps avoid the issues with machine-learned models that use handcrafted features that are tuned for a narrow type of behavior, which can be lossy due to the use of aggregations and summary statistics, and additionally have trouble scaling. More particularly, hand-crafted features often rely upon summarization techniques that can result in some information being lost during the summarization process. Rather, the machine-learned model does not lose information via a limited set of lossy handcrafted features. Further, by maximally leveraging the available signal using deep learning rather than feature engineering, signal limitations of alternative models can be ameliorated. Abuse can be caught earlier, because the technique allows the model to exploit more of the behavioral signal that is already available in the data.

DESCRIPTION

The disclosed embodiments provide a method, apparatus, and system for training and using a deep learning machine-learned model that operates directly on a raw sequence of user activity in an online network, in order to detect abusive activities. This allows the system to scalably leverage more of the available signal hidden in the data and stop adversarial attacks more efficiently than other machine-learned models.

The term "abusive" in this context means that the user account that is associated with the activities is engaging in operations that are prohibited by the online network. This may include, but is not limited to, scraping data without permission, creation of fake accounts, account takeovers, and automated spam. Not all of these activities are always "bad". Scraping, for example, is expressly authorized for search engines in order to collect and index information throughout the Internet. What makes scraping abusive is when it is performed without permission. Unauthorized scraping refers to the automated collection of data from the online network without the permission of the online network or its users. One strategy that unauthorized scrapers use to collect data is to automate the behavior of accounts logged into the online network. Logged-in scraping can be performed by real accounts (e.g., users using browser extensions to automate their behavior) or fake accounts (accounts that do not correspond to a real person, which are created by bad actors to scale their ability to scrape data).

It should be noted that while specific embodiments are described herein in the context of scraping, the same deep learning model may be used to detect other types of abusive operations, and nothing in this document shall be interpreted as limiting scope of protection to scraping detection, unless expressly recited.

As a user visits an online network, such as a social networking service, the user's web browser or application makes many requests to the servers of the online network. Each request includes a path identifying the part of the online network the user's browser or application intends to access. FIG. 1 is a diagram illustrating a visualization of profile scraping activity by a logged-in member, in accordance with an example embodiment. Here, a sequence 100 is visualized as a series of discrete operations, each classified under a different "type" of operation. For example, some of the operations are profile view operations 102, some of the operations are search operations 104, some of the operations are login operations 106, some of the operations are logout operations 108, and the remainder are classified as "other user actions" 110. Graph 112 depicts how each sequence, such as sequence 100, sequence 114, sequence 116, sequence 118, and sequence 120 may be performed at different times or in different sessions. Each sequence represents a series of requests. The sequences may be divided from each other based on either time or session. For example, the system may divide sequences by day, such that each sequence is a different day's requests from a particular user. Alternatively, the system may divide sequences by session, such that each sequence is a different session's requests from the particular user. The y-axis of the graph 112 represents the distinct profiles views—each unique profile viewed is assigned a new identifier. The x-axis is time. This particular user viewed five bursts of approximately 20 profiles each, while occasionally revisiting the same profiles they had viewed previously.

In an example embodiment, an automated process may be used to translate the specific path in each request a user makes into a standardized model vocabulary. Specifically, each specific request path is translated into a standardized token that indicates the type of the request (e.g., profile view, search, login, etc.). Each token is an alphanumeric sequence that uniquely corresponds to the type of the request. For example, "profile view" may represent a profile view, or alternatively "1X3F" may represent a profile view. Thus, if, the path "linkedin.com/jamesverbus/" corresponds to a profile view, then this path is translated to "profile view". This is performed in an automated manner that does not require human curation. The result is an encoded activity sequence, where each request path has been replaced by a standardized token representing the activity type.

Notably, the request paths in the sequence of request paths are still kept in the same order when they are encoded. In other words, if a particular request path came first in the sequence, when that request path is standardized the resultant token will also come first in the encoded version of the sequence. The same is true for all the other request paths in the sequence. Thus, the encoded activity sequence includes the encoded request paths and the order of those encoded request paths.

Then the standardized request paths are mapped to integers based on a ranking of the frequency of that request path across all users. For example, if the profile view was the $3^{rd}$ most frequently standardized request graph among all users during the time period, then the "profile view" standardized request path would be mapped to the integer "3" This allows information about how common a given type of request is to be provided to the machine-learned model. The integer array is the activity sequence that is fed into the deep learning algorithm.

Figure 2:
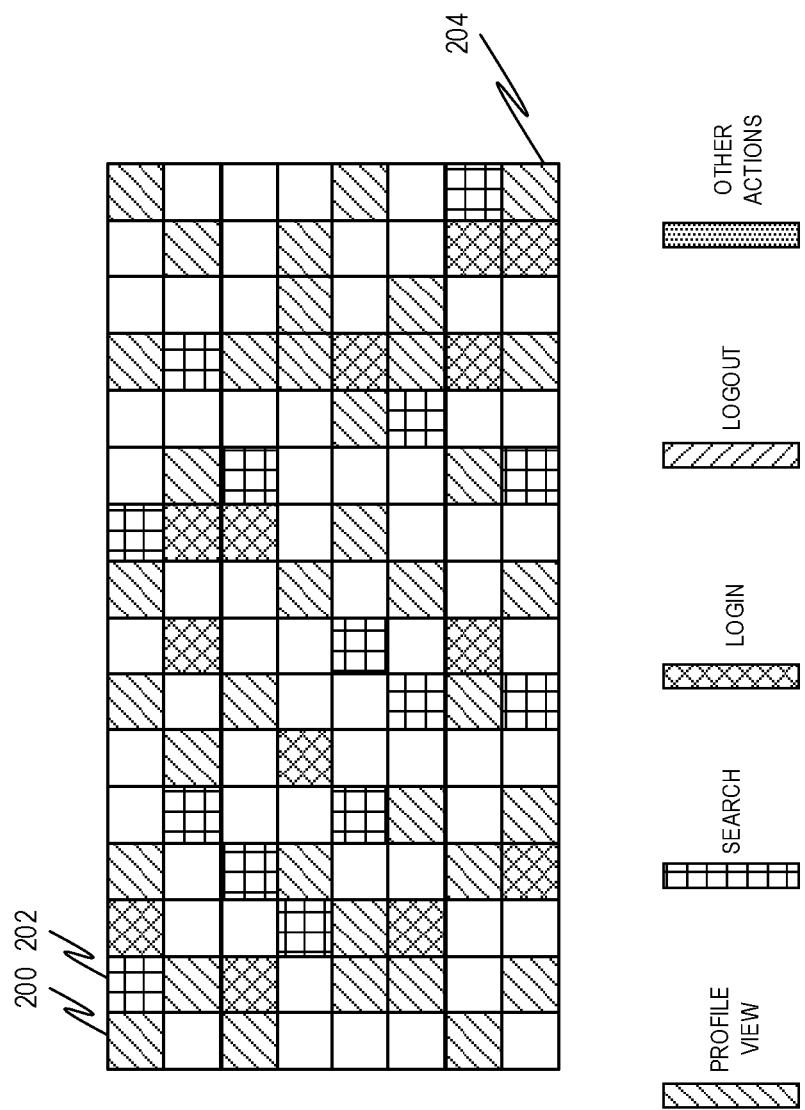
FIG. 2 is a diagram illustrating a visualization of a resulting encoded activity sequence of a first user, in accordance with an example embodiment.

FIG. 2 is a diagram illustrating a visualization of a resulting encoded activity sequence of a first user, in accordance with an example embodiment. Here, each activity operation is represented as a box, such as box 200 or box 202. These boxes are patterned in a way that common paths use the same pattern, and the uncommon paths use a different pattern (with different patterns for different levels of commonality in the paths). The visualization may be read left to right, top to bottom, with the first request being at box 200, and the last at box 204. Here, the first user is not using abusive automation, as evidenced by the fact that the operations are more heterogeneous.

Figure 3:
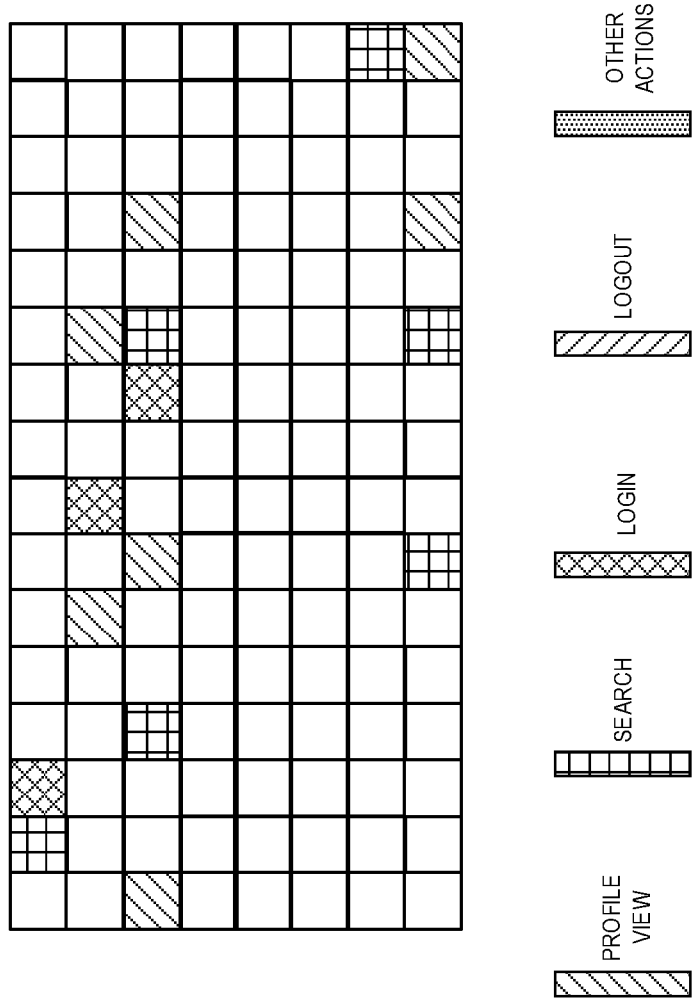
FIG. 3 is a diagram illustrating a visualization of a resulting encoded activity sequence of a second user, in accordance with an example embodiment.

FIG. 3 is a diagram illustrating a visualization of a resulting encoded activity sequence of a second user, in accordance with an example embodiment. Here, the user is using abusive automation, as evidenced by the fact that the operations are more homogenous. It is difficult for bad actors using automation to simulate the subtle patterns of requests created by normal, healthy, organic user behavior in an online network. Of course, these patterns and their classification are determined by the deep learning algorithm, and not by a human viewer, and FIGS. 2 and 3 are merely visualizations for the reader of this document to help illustrate the differences in the patterns.

As mentioned earlier, the deep learning algorithm may then use natural language processing (NLP) techniques to classify these sequences. Rather than classify the sentiment of a sequence of human-language words as positive or negative, however, here a sequence of user requests is classified as abusive or not abusive.

Figure 4:
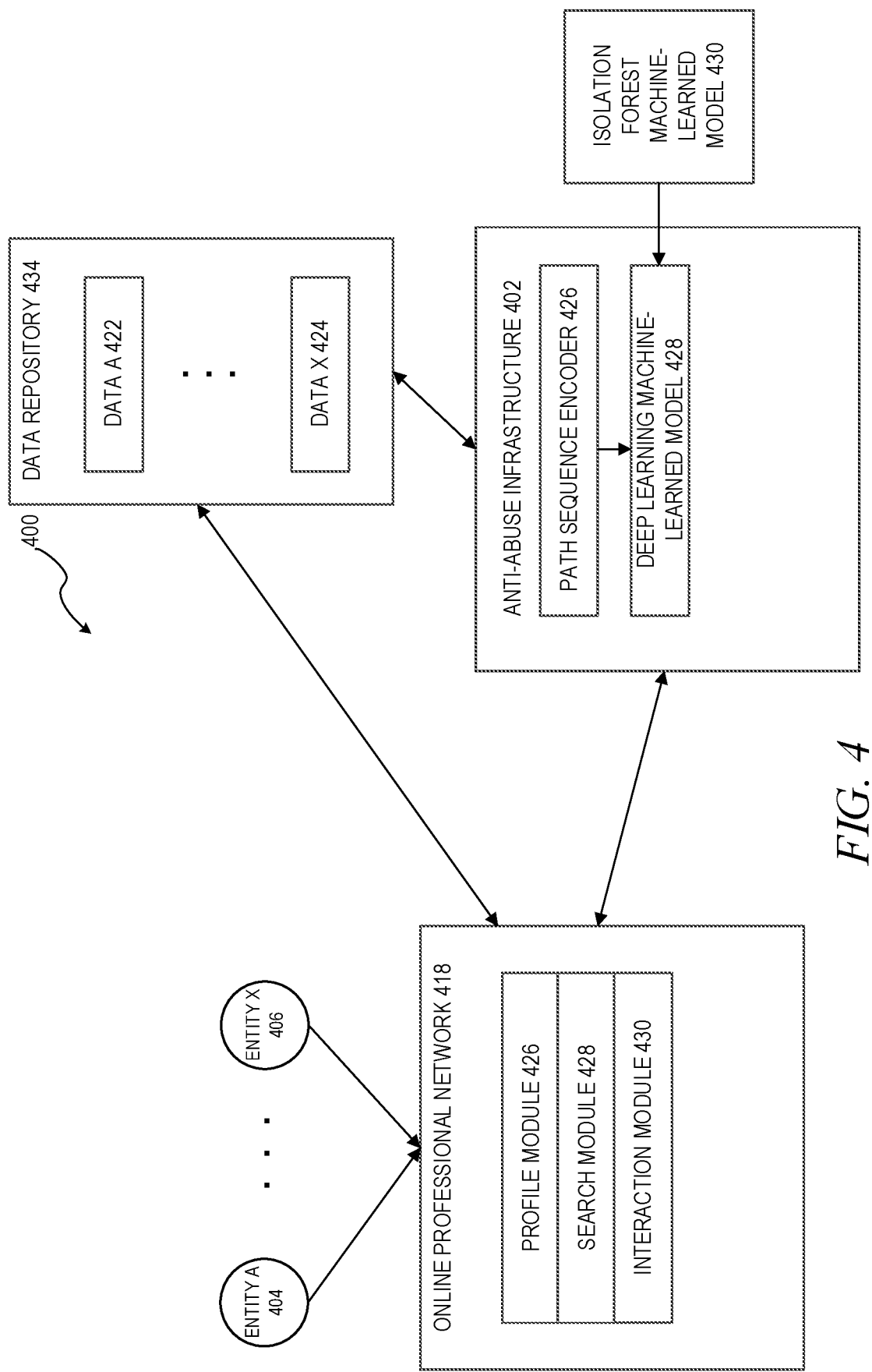
FIG. 4 is a block diagram illustrating a system for detecting abusive operations in an online network, in accordance with an example embodiment.

The disclosed embodiments provide a method, apparatus, and system for managing malicious user activity with a service. FIG. 4 is a block diagram illustrating a system 400 for detecting abusive operations in an online network, in accordance with an example embodiment. The detection components may be implemented as a service that may be provided by or associated with an online professional network 418 or other community of users, which is used by a set of entities (e.g., entity A 404, entity X 406) to interact with one another in a professional, business and/or social context.

The entities may include users that use online professional network 418 to establish and maintain professional connections, list work and community experience, endorse and/or recommend one another, search and apply for jobs, and/or perform other actions. The entities may also include companies, employers, and/or recruiters that use the online professional network 418 to list jobs, search for potential candidates, provide business-related updates to users, advertise, and/or take other action. The entities may further include guests that are not registered users of the online professional network 418 and thus have restricted access to the online professional network.

Entities that are registered users of online professional network 418 may use a profile module 426 in the online professional network 418 to create and edit profiles containing information related to the entities' professional and/or industry backgrounds, experiences, summaries, projects, skills, and so on. The profile module 426 may also allow the entities to view the profiles of other entities in the online professional network 418.

Entities that are registered users and guests may use a search module 428 to search the online professional network 418 for people, companies, jobs, and/or other job- or business-related information. For example, the entities may input one or more keywords into a search bar to find profiles, job postings, articles, advertisements, and/or other information that includes and/or otherwise matches the keyword(s). The entities may additionally use an "Advanced Search" feature of the online professional network 418 to search for profiles, jobs, and/or other information by categories such as first name, last name, title, company, school, location, interests, relationship, industry, groups, salary, experience level, etc.

Entities that are registered users of the online professional network 418 may also use an interaction module 430 to interact with other entities in the online professional network 418. For example, the interaction module 430 may allow an entity to add other entities as connections, follow other entities, send and receive messages with other entities, join groups, and/or interact with (e.g., create, share, re-share, like, and/or comment on) posts from other entities. The interaction module 430 may also allow the entity to upload and/or link an address book or contact list to facilitate connections, follows, messaging, and/or other types of interactions with the entity's external contacts.

Those skilled in the art will appreciate that online professional network 418 may include other components and/or modules. For example, the online professional network 418 may include a homepage, landing page, and/or content feed that provides the latest postings, articles, and/or updates from the entities' connections and/or groups to the entities. Similarly, the online professional network 418 may include features or mechanisms for recommending connections, job postings, articles, and/or groups to the entities. Additionally, there are other requests that aren't directly mapped to a user-facing component or activity such as profile views, searches, and likes, that are encoded in the activity sequence data. For example, these requests might relate to downstream API calls on the server side. These requests can provide some of the rich signal that the model can exploit better than could be exploited with traditional models using hand-crafted features.

In one or more embodiments, data (e.g., data A 422, data X 424) related to the entities' operations on the online professional network 418 is aggregated into a data repository 434 for subsequent retrieval and use. For example, each login, logout, profile search, profile update, profile view, connection, follow, post, comment, like, share, click, message, interaction with a group, and/or other action performed by an entity in the online professional network may be logged and stored in a database, data warehouse, cloud storage, and/or other data-storage mechanism providing data repository 434.

In turn, the data may be analyzed by an anti-abuse infrastructure 402 in a real-time, nearline, and/or offline basis to detect and respond to attacks such as security breaches, fake user accounts, account takeovers, spamming, phishing, scraping, and/or other types of malicious or undesired user activity with the online professional network 418.

Anti-Abuse infrastructure 402 may include a path sequence encoder 426. The path sequence encoder 426 translates each specific request path from the data repository 434 into a standardized token that indicates the type of request, and encodes the sequence of operations as integers based upon frequency. More particularly, the standardized request paths are mapped to integers based on the ranking of the frequency of that request path across all users (i.e., across all sequences, not just this sequence) during a particular time frame of interest. Thus, the path sequence enters the path sequence encoder 426 and comes out as a sequence of tokens and integers, with each token representing the type of the operation and each integer indicating how frequently that request path was performed across all users. In an example embodiment, this may be stored as a sequence in the format: <token1>, <integer1>, <token2>, <integer2>, . . . .

Thus, the ranking of the frequency that each standardized request path was requested across all users during the particular time frame of interest is used as the integer for each corresponding standardized request path. The most popular standardized request path is assigned an integer of "1", the second most popular is assigned an integer of "2", and so on. The frequencies are calculated when the path sequence encoder 426 is mapping the request paths into tokens. Thus, for example, if the particular time frame of interest is the previous 4 days, then when the path sequence encoder 426 is mapping the request paths into tokens, it calculates the number of times each request path was requested across all users during the last 4 days, which then represent the frequencies, and then ranks each of those request paths based on their corresponding number of times requested over those 4 days.

This sequence is then passed to the deep learning machine-learned model 428, along with timing information from the data repository 434. The timing information indicates the time between user operations (Δt) within the sequence.

It should be noted that the deep learning machine-learned model 428 may be operated in either a training mode or an evaluation mode. In training mode, the sequences from the path sequence encoder 426 are training data that are fed to the deep learning machine-learned model 428 along with labels indicative of whether those sequences represented abusive operations or not. In an example embodiment, these labels are binary in nature (e.g., "1" if the corresponding operations are abusive, "0" if not). In another example embodiment, the labels are non-binary, and can represent the extent or degree to which the sequences represent abusive operations or not (allowing for, for example, a sequence to be considered "mostly" abusive, or "partly" abusive, or the like).

In an example embodiment, the labels may themselves be obtained from an isolation-forest machine-learned model 430, which takes the sequences (or the raw data from the data repository 434) as input and outputs a score indicative of a measure of abusiveness of the corresponding operations. This isolation-forest machine-learned model 430 will be described in more detail below.

It is not mandatory that this isolation-forest machine-learned model 430 be used to generate the labels, and embodiments are foreseen where the labels are obtained in a different manner, such as through hand-labeling and/or maintaining a repository of examples of prior abusive behavior.

Figure 5:
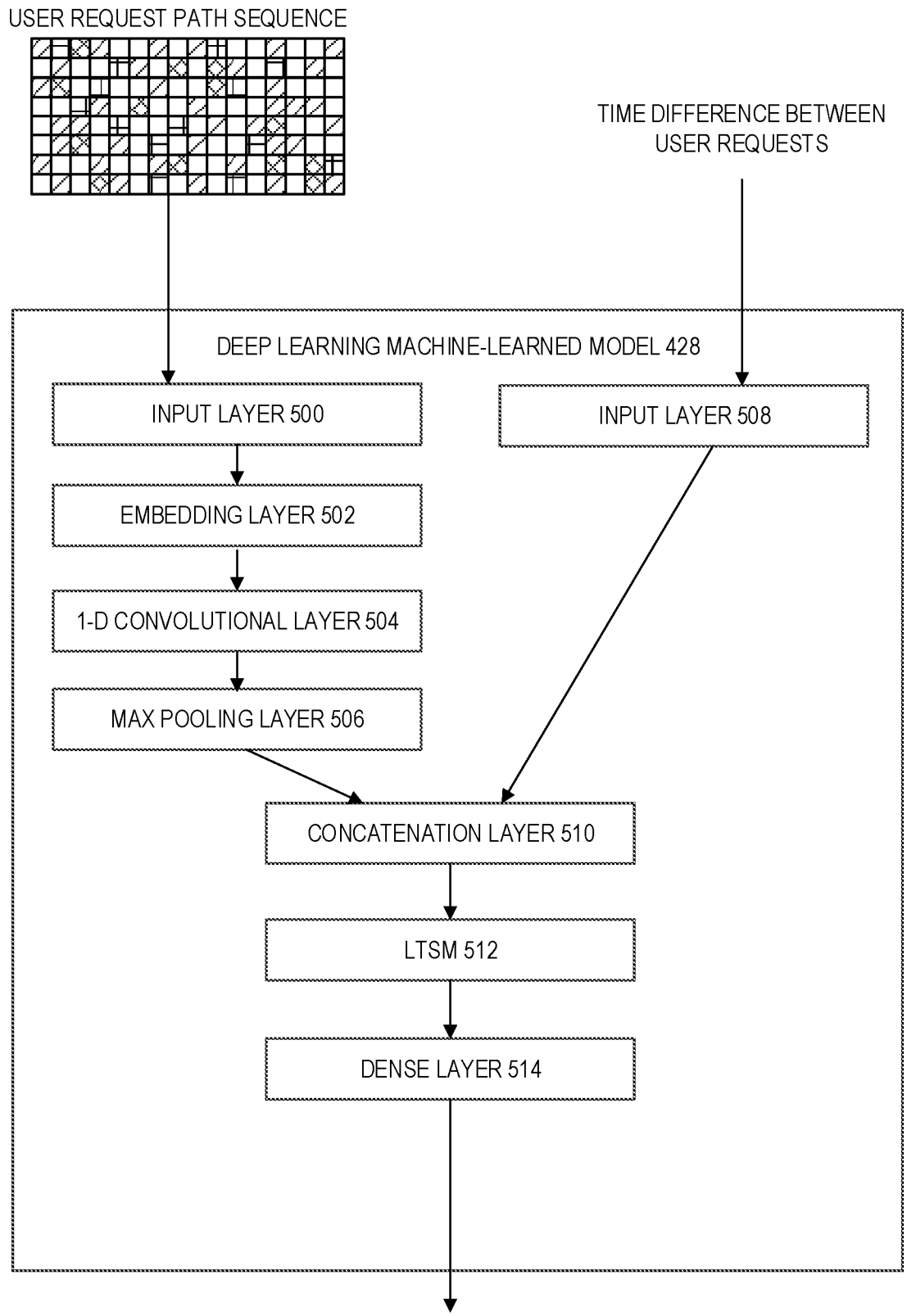
FIG. 5 is a block diagram illustrating a deep learning machine-learned model in more detail, in accordance with an example embodiment.

FIG. 5 is a block diagram illustrating a deep learning machine-learned model 428 in more detail, in accordance with an example embodiment. An encoded user request path sequence is passed to an input layer 500. The input layer 500 receives the sequence and passes to an embedding layer 502, which learns embedding of the standardized request paths. Learning embeddings is a process whereby each standardized request path is assigned a different set of coordinates in an n-dimensional space. Each of these sets of coordinates is considered a different embedding. The relationships between the sets of coordinates in the n-dimensional space is representative of the similarity of respective standardized requests paths—if two paths are embedded to coordinates that are closer to each other in the n-dimensional space, this is indicative that the paths are similar to each other, whereas paths embedded to coordinates that are further from each other in the n-dimensional space is indicative that the paths are dissimilar to each other. Similarity is based on the labels of the training data used to train the embedding layer 502.

More particularly, in an example embodiment the embedding layer 502 may be thought of as its own machine-learned model, which is trained using training data comprising pairs of request paths with labels indicative of the similarity of the corresponding pairs of request paths. For example, the label may be a value between 0 and 1, with 0 indicating that the request paths in the pair are completely dissimilar and 1 indicating that the request paths in the pair are identical. The embedding layer 502 then learns the similarities between various request paths based on this training data, and uses it to embed unlabeled request paths fed to it from the input layer 500.

This allows the deep learning machine-learned model 428 to learn if multiple different standardized paths represent similar actions based upon the surrounding context in the sequence.

A 1-dimensional (1-D) convolutional layer 504 is then used to identify short, suspicious sequences of paths in a translationally invariant way. Then, a max pooling layer 506 reduces the dimensionality of the output of the 1-D convolutional layer 504.

Separately, input layer 508 receives a time difference between user requests. This time difference is then concatenated with the output of the max pooling layer 506 in a concatenation layer. This concatenation is then passed to an LTSM 512. The output of the LTSM 512 is then passed to a dense layer 514, which outputs an indication of whether the user request path sequence appears abusive or not.

An LTSM has four separate neural network layers interacting in a special way. The first layer is a sigmoid layer that decides which information to discard from the cell state. This layer decides what information to forget, such as forgetting the gender of a subject when a new subject is encountered in a sentence. The second layer is a sigmoid layer that decides which values to save in the cell. The third layer then updates the new cell state based on the decisions from the first and second layers. The fourth layer is another sigmoid layer that decides what will be output.

Referring back to the isolation-forest machine-learned model 430 of FIG. 4, isolation forest is a type of unsupervised outlier detection that leverages the fact that outliers are "few" and different", meaning that they are fewer in number and have unusual feature values compared to the inlier class. The isolation forest algorithm uses a randomly-generated binary tree structure to non-parametrically capture the multi-dimensional feature distribution of the training dataset. Each isolation tree is created by first randomly sampling N instance from the training dataset, and then, at each node, randomly choosing a feature to split upon and then randomly choosing a split value from a uniform distribution spanning from the minimum value to the maximum value of the feature chosen to split upon. The last two steps are then repeated recursively until, in principle, all N instances from the sample are "isolated" in leaf nodes of the isolation tree—one training instance per leaf node. In practice, the tree need not be built so deeply and can apply a height limit.

Figure 6:
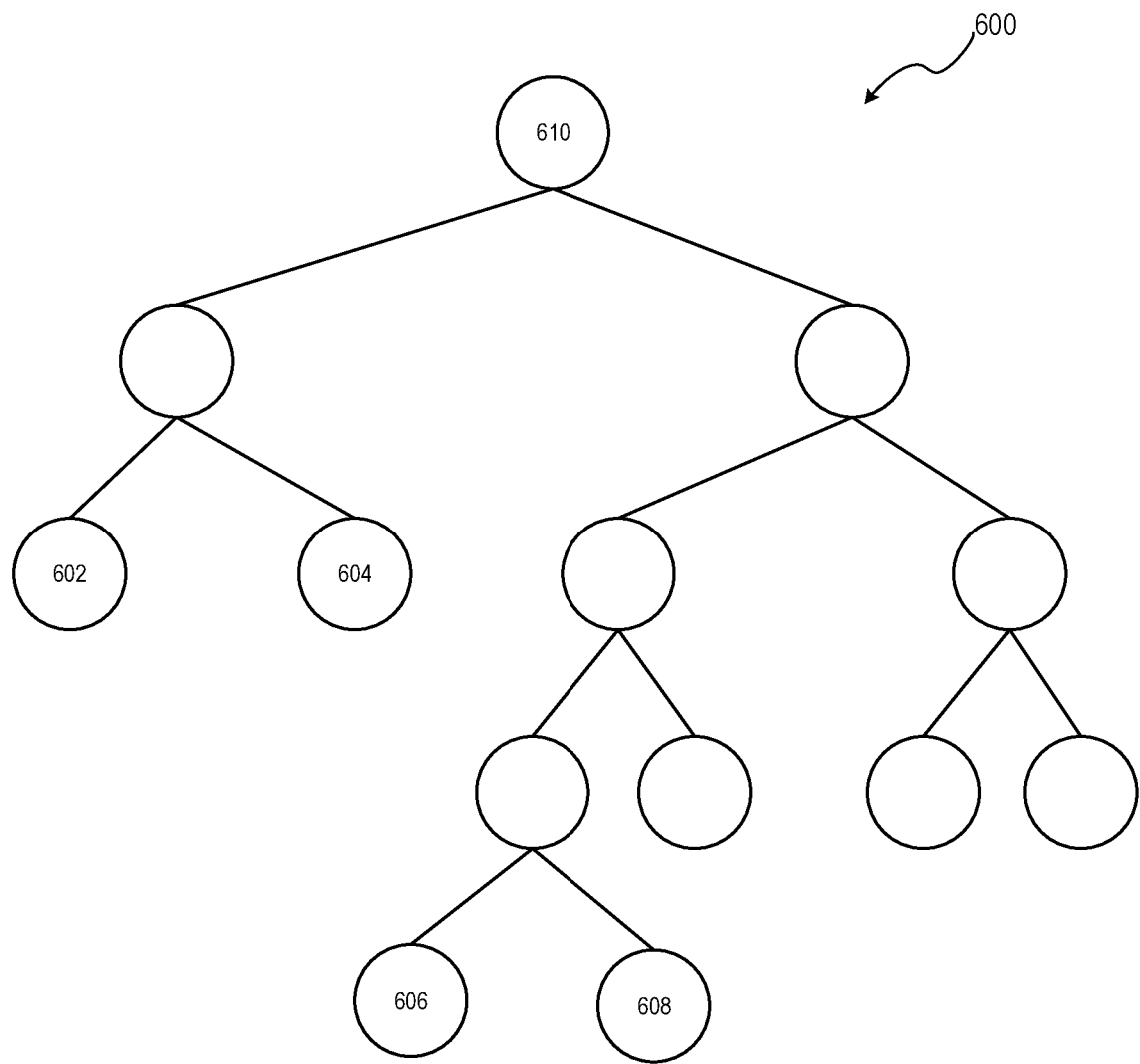
FIG. 6 is a block diagram illustrating an example isolation tree in accordance with an example embodiment.

FIG. 6 is a block diagram illustrating an example isolation tree 600 in accordance with an example embodiment. Outliers, such as nodes 602 and 604, are easier to isolate, while inliers, such as nodes 606 and 608, are harder to isolate. With respect to standardized request paths, nodes 602 and 604 may represent request types that are atypical for the sequence, while nodes 606 and 608 may represent request types that are typical for the sequence. More particularly, outliers require fewer random splits to achieve isolation, on average. The result is a shorter expected path length from a root node 610 to an outlier node, such as nodes 602 and 604.

An outlier score for a particular instance is a function of the path length from the root node 610 to a leaf node and the total number of training instances used to build the tree.

If a height limit is applied when building the tree, some leaf nodes will end up with more training instances than others. This is useful additional information that can be incorporated into the outlier score. The average depth for an unsuccessful search in a binary search tree created with N instances is given by:

$$c(N) = 2H(N-1) - \left(\frac{2(N-1)}{N}\right),$$

where $H(i) \approx \ln(i) + 0.5772156649$. Due to the similar structure of binary search trees and isolation trees, the value c(N) provides the average depth of an isolation tree created using N training instances. For leaf nodes containing M>1 training instances, one can add c(M) to the measured path length from the root to the leaf node to account for the number of instances terminating in the leaf node: this sum yields the effective path length for a particular instance, $h(x_i)$.

An ensemble of isolation trees, called an isolation forest, can then be trained and their outputs can be averaged across to reduce the variance of the isolation-forest machine-learned model 430. Once an isolation-forest machine-learned model 430 is trained, the outlier score for an instance $x_i$ is given by:

$$s(x_i, N) = 2^{\frac{-E(h(x_i))}{c(N)}},$$

wherein $E(h(x_i))$ is the effective path length for that instance, $h(x_i)$), averaged across all trees in the ensemble, and C(N) is the expected depth of an isolation tree given N training instances discussed previously. This uncalibrated score $s(x_i, N)$ ranges from 0 to 1, with higher scores being more outlier-like.

For some types of abuse, such as spam, it is possible to have a scalable review process where humans label training examples as spam or not spam. There are other types of abuse, however, such as scraping, where this kind of scalable human labeling is much more difficult, or impossible. Often, the labels that are able to be obtained for training and evaluation are fuzzy, and the precision may be less than ideal, as well as there being poor recall for some types of abusive behavior. Using an unsupervised machine-learned model such as an isolation forest is helpful for problems with few or no labels, as it helps to circumnavigate these label-based challenges.

Figure 7:
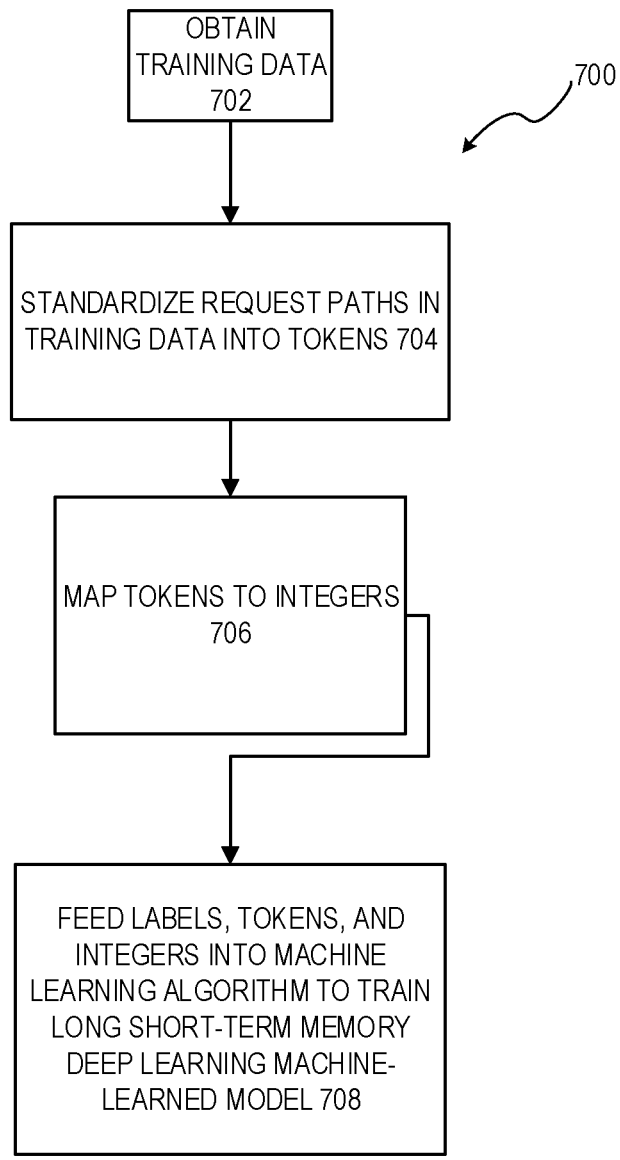
FIG. 7 is a flow diagram illustrating a method, in accordance with an example embodiment.

FIG. 7 is a flow diagram illustrating a method 700, in accordance with an example embodiment. At operation 702, training data is obtained. This training data including sequences of operations performed by accounts of an online network, each sequence indicating a request path for one or more of the operations and an order for the operations. At operation 704, the request paths in the training data are standardized into tokens reflective of operation types of corresponding request paths. At operation 706, the tokens are mapped to integers reflecting a frequency of occurrences of the request paths in sequences of operations performed by a plurality of accounts of the online network. At operation 708, a label for each sequence of operations, the corresponding tokens, and the corresponding integers are fed into a machine learning algorithm to train a long short-term memory deep learning machine-learned model. This training trains the model to calculate a score indicative of a likelihood that a subsequent sequence of operations performed by another account of the online network fed as input to the long short-term memory deep learning machine learned model constitutes abusive operations.

Figure 8:
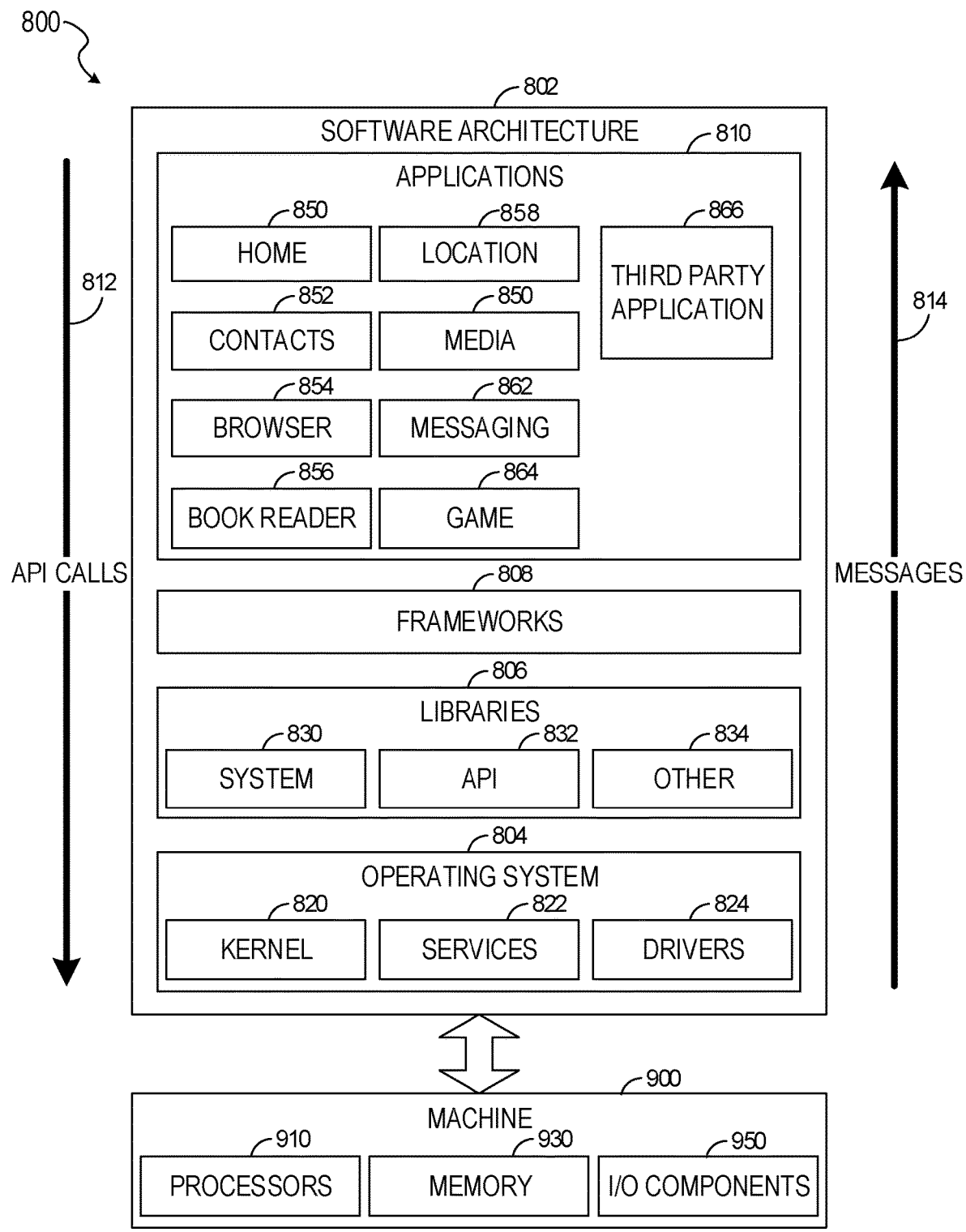
FIG. 8 is a block diagram illustrating a software architecture, in accordance with an example embodiment.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
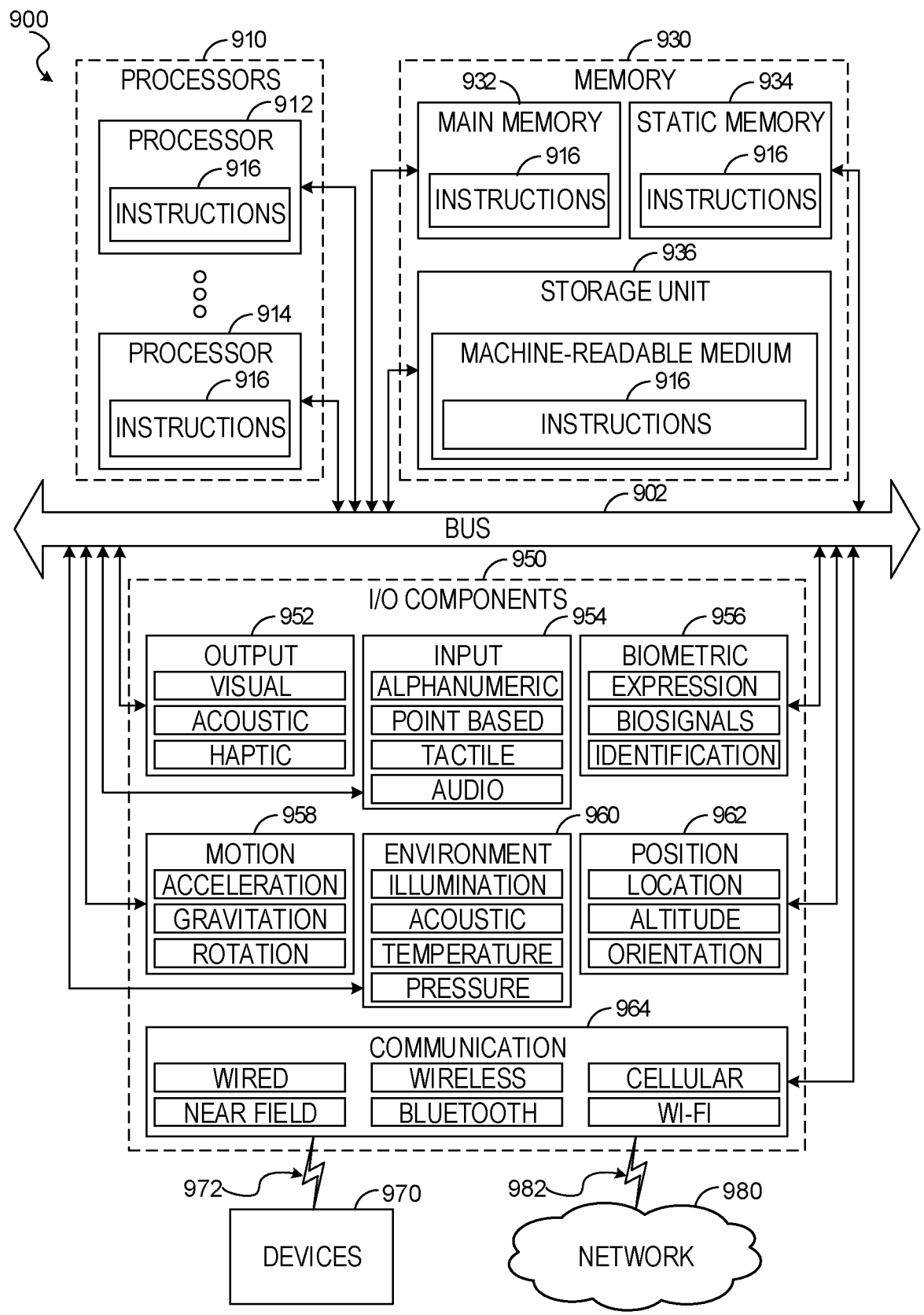
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein may be executed. For example, the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors 912 (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor), multiple processors 910 with a single core, multiple processors 910 with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to the processors 910. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a non-transitory computer-readable medium having instructions stored thereon, which, when executed by a processor, cause the system to perform operations comprising:
   obtaining a first sequence of operations performed by a first account of an online network, the first sequence of operations indicating at least one request path for one or more of the operations and an order for the operations;
   standardizing the at least one request path into tokens reflective of operation types of request paths;
   mapping the tokens to integers reflecting a ranking of a frequency of occurrences of the at least one request path in sequences of operations, including the first sequence of operations, performed by a plurality of accounts of the online network; and
   feeding a label for the first sequence of operations, the tokens, and the integers into a machine learning algorithm to train a long short-term memory deep learning machine-learned model to calculate a score indicative of a likelihood that a subsequent second sequence of operations performed by a second account of the online network fed as input to the long short-term memory deep learning machine learned model constitutes abusive operations.

2. The system of claim 1, wherein the label is obtained from a value output by an isolation-forest machine-learned model in response to the isolation-forest machine-learned model evaluating the first sequence of operations.

3. The system of claim 1, wherein the types of corresponding request paths include at least one selected from a group comprising: profile view type profile search type, login type, and logout type, or any combination thereof.

4. The system of claim 1, wherein the abusive operations comprise scraping of data in the online network.

5. The system of claim 4, wherein the data includes a plurality of user profiles.

6. The system of claim 1, wherein the long short-term memory deep learning machine-learned model is trained based on a concatenation of the tokens, integers, and timing information reflecting a time period between request paths.

7. The system of claim 1, wherein the long short-term memory deep learning machine-learned model includes an embedding layer, which takes a standardized request path and maps the standardized request to a set of coordinates in an n-dimensional space.

8. The system of claim 7, wherein the embedding layer is designed to map similar request paths to coordinates in the n-dimensional space that are closer together than coordinates to which dissimilar request paths are mapped.

9. The system of claim 7, wherein the long short-term memory deep learning machine-learned model further includes a one-dimensional convolutional layer.

10. The system of claim 9, wherein the long short-term memory deep learning machine-learned model further includes a max pooling layer.

11. The system of claim 10, wherein the long short-term memory deep learning machine-learned model further includes a concatenation layer, which concatenates output of the max pooling layer with a time difference between user requests.

12. The system of claim 11, wherein output of the concatenation layer is fed to a long short-term memory.

13. The system of claim 12, wherein output of the long short-term memory is sent to a dense layer, which outputs the score.

14. A method comprising:
    obtaining a first sequence of operations performed by a first account of an online network, the first sequence of operations indicating at least one request path for one or more of the operations and an order for the operations;
    standardizing the at least one request path into tokens reflective of operation types of request paths;
    mapping the tokens to integers reflecting a ranking of a frequency of occurrences of the at least one request path in sequences of operations, including the first sequence of operations, performed by a plurality of accounts of the online network; and
    feeding a label for the first sequence of operations, the tokens, and the integers into a machine learning algorithm to train a long short-term memory deep learning machine-learned model to calculate a score indicative of a likelihood that a subsequent second sequence of operations performed by a second account of the online network fed as input to the long short-term memory deep learning machine learned model constitutes abusive operations.

15. The method of claim 14, wherein the long short-term memory deep learning machine-learned model is trained by a machine learning algorithm using training data include at least one label, wherein the at least one label is obtained from a value output by an isolation-forest machine-learned model in response to the isolation-forest machine-learned model evaluating the first sequence of operations.

16. The method of claim 14, wherein the types of corresponding request paths include at least one selected from a group comprising: profile view type, profile search type, login type, and logout type, or any combination thereof.

17. The method of claim 14, wherein the abusive operations comprise scraping of data in the online network.

18. The method of claim 17, wherein the data includes a plurality of user profiles.

19. The method of claim 14, wherein the long short-term memory deep learning machine-learned model is trained based on a concatenation of the tokens, integers, and timing information reflecting a time period between request paths.

20. A system comprising:
obtaining a first sequence of operations performed by a first account of an online network, the first sequence of operations indicating at least one request path for one or more of the operations and an order for the operations;
standardizing the at least one request path into tokens reflective of operation types of request paths;
mapping the tokens to integers reflecting a ranking of a frequency of occurrences of the at least one request path in sequences of operations, including the first sequence of operations, performed by a plurality of accounts of the online network; and
feeding a label for the first sequence of operations, the tokens, and the integers into a machine learning algorithm to train a long short-term memory deep learning machine-learned model to calculate a score indicative of a likelihood that a subsequent second sequence of operations performed by a second account of the online network fed as input to the long short-term memory deep learning machine learned model constitutes abusive operations.

* * * * *

UNITED STATES PATENT AND TRADEMARK OFFICE
CERTIFICATE OF CORRECTION

PATENT NO. : 11,936,682 B2
APPLICATION NO. : 17/534148
DATED : March 19, 2024
INVENTOR(S) : Verbus et al.

It is certified that error appears in the above-identified patent and that said Letters Patent is hereby corrected as shown below:

In the Claims

In Column 15, Line 60, Claim 3, after "view type", insert --,--

Signed and Sealed this
Thirtieth Day of April, 2024

Katherine Kelly Vidal
*Director of the United States Patent and Trademark Office*